Aug. 2, 1966   K. APPLEMAN   3,263,594
COMBINED BROILER AND ROTISSERIE UNIT
Filed March 12, 1965   2 Sheets-Sheet 2
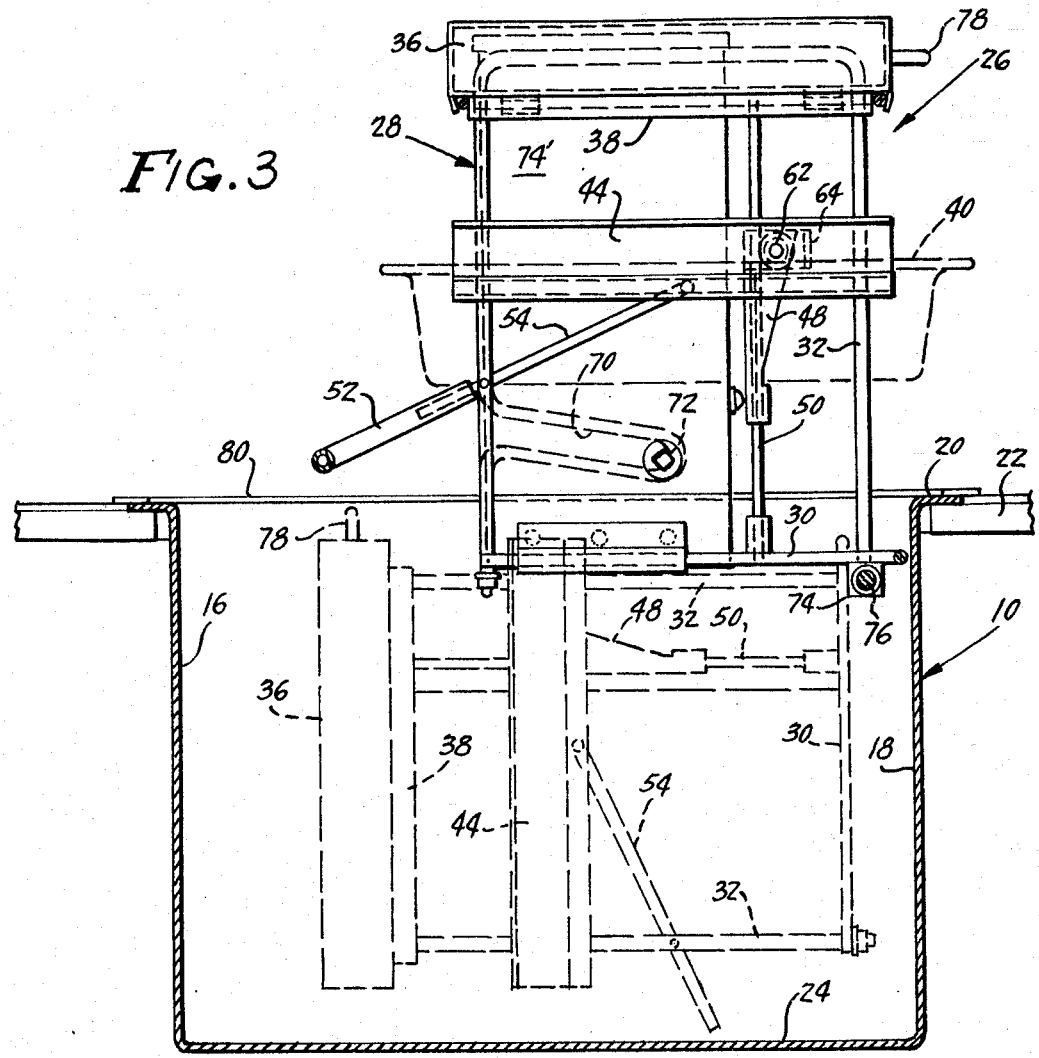
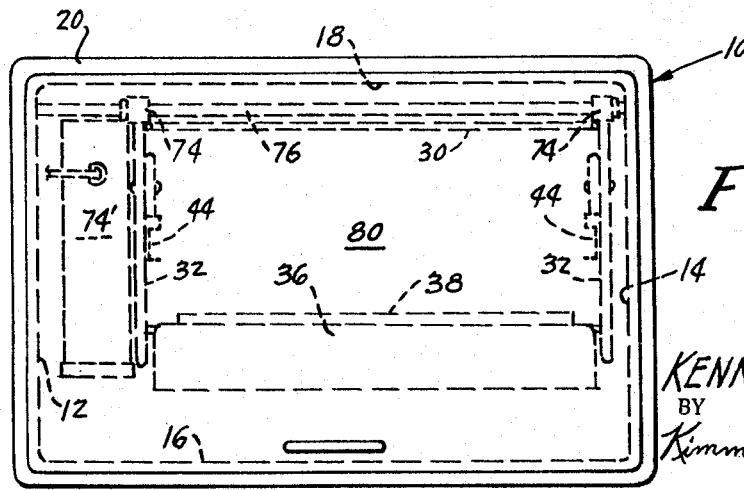
INVENTOR.
KENNETH APPLEMAN
BY
Kimmel, Crowell & Weaver
ATTORNEYS.

United States Patent Office 3,263,594
Patented August 2, 1966

3,263,594
COMBINED BROILER AND ROTISSERIE UNIT
Kenneth Appleman, New York, N.Y., assignor to Purcarb, Inc., New York, N.Y., a corporation of New York
Filed Mar. 12, 1965, Ser. No. 439,187
7 Claims. (Cl. 99—340)

The present invention relates to a combined broiler and rotisserie unit for installation in a counter top and one which is movable from a concealed position to a position of use out of concealment.

Presently in use and commercially available are broiler and rotisserie units for house and restaurant installation. Such units, as have been proposed or are available, occupy counter space or table top space when not in use and with the modern trend to small compact kitchens such units occupy needed space. Further, such units as are available are cumbersome to move from place to place in order that they be moved into and out of a place of storage.

An object of the present invention is to provide a broiler and rotisserie unit which is movable from a point of concealment beneath a counter or table top to a position of use above the counter or table top.

Another object of the present invention is to provide, in a broiler and rotisserie unit, a solid quartz slab which is useful in producing food of the most excellent flavor, comparing favorably and surpassing the food produced by the use of charcoal and the like.

A further object of the present invention is to provide in a broiler and rotisserie unit a highly efficient form of heat radiation so that food prepared thereon preserves and retains all the natural food juices.

A still further object of the present invention is to provide in a broiler unit means for destroying more of the fat particles within meat and the like, such fat particles being harmful in the main to the human person when consumed.

Another object of the present invention is to provide in a broiler unit means for cooking food so as to have a charcoal flavor without the use of flame or smoke.

Still another object of the present invention is to provide in a broiler unit means for shifting the food toward and away from the source of radiant heat, which means is simple in structure, efficient in operation, and economically feasible.

Figure 1:
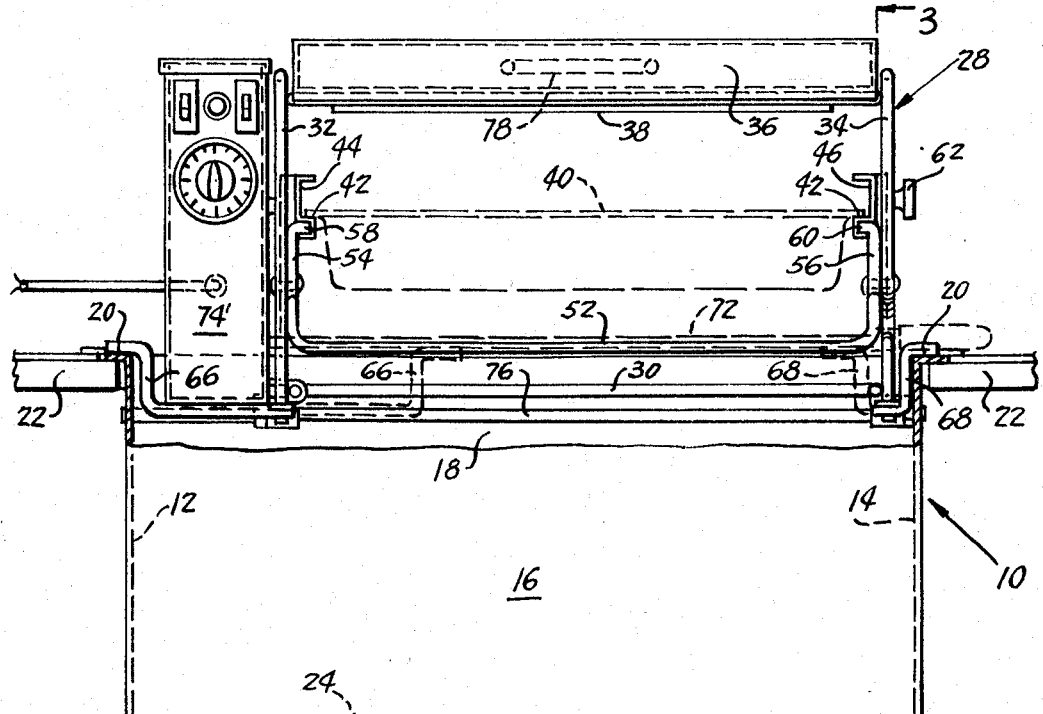
Figure 2:
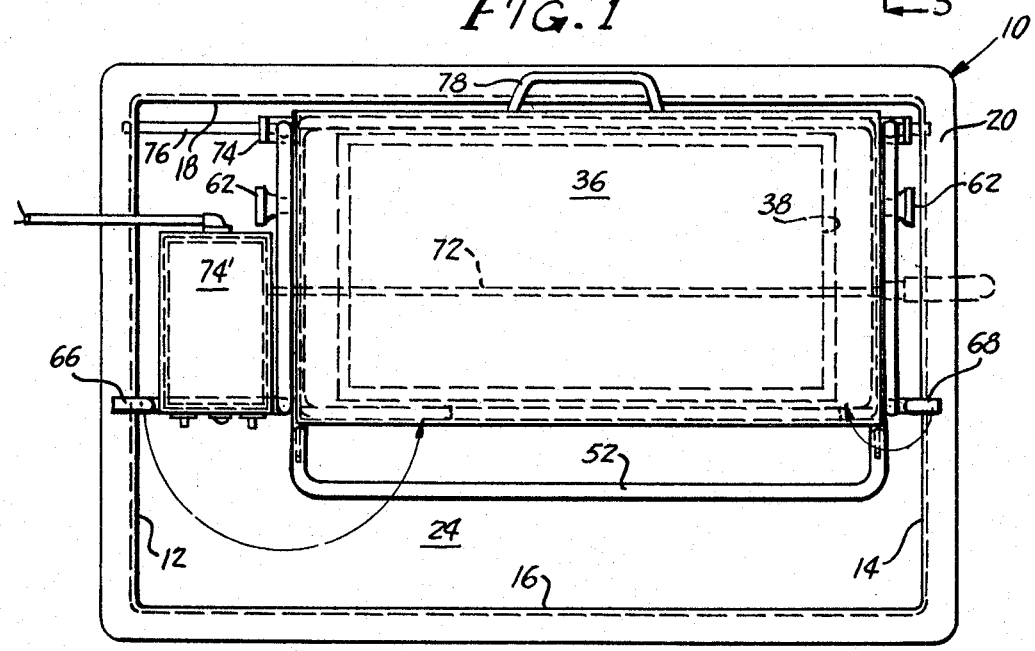

These and other objects and advantages of the invention will be fully apparent from the following description when taken in connection with the annexed drawings, in which:

FIGURE 1 is a front elevational view partially in section showing the unit of the present invention in a condition of use out of concealment within its well, FIGURE 2 is a top plan view of the assembly shown in FIGURE 1, the dotted line indicating the position of the unit when concealed within the well, FIGURE 3 is a view on line 3—3 of FIGURE 1, and FIGURE 4 is a top plan view of the unit when concealed within the well, the unit being shown in dotted lines.

Referring in detail to the drawings in which like numerals indicate like parts throughout several views, the unit of the present invention includes a well 10 having spaced apart parallel side walls 12 and 14, a front wall 16 and a rear wall 18. A rim 20 extends about the upper ends of the walls and projects outwardly to overlie the sides of an opening in a counter top or table top as at 22. The well 10 includes a bottom 24 formed integrally with the side walls and with the front and rear walls in the most preferred form of the invention.

The broiler unit, combined with a rotisserie, is indicated generally by the reference numeral 26 and it includes a frame 28 movable from a vertical position substantially out of the well 10 as in FIGURE 3, to a concealed position within the well 10, as shown in dotted line as in FIGURE 3.

The frame 28 includes a base member 30 substantially rectangular in form and a pair of spaced-apart side members 32 and 34 which have their bights uppermost when in the "use" position as in FIGURE 3 in solid lines. A shell or housing 36 is carried on the upper ends of the side members 32 and 34 when the frame 28 is in the vertical position and within the shell or housing 36 is a quartz slab heating element 38 which faces downwardly.

A food rack, as at 40 in FIGURES 1 and 3, is positioned within the frame 28 and is mounted therein for movement toward and away from the heating element 38. The rack 40 is in the form of a shallow pan having flanges 42 at each end which are received in the channel members 44 and 46 on the side members 32 and 34, respectively.

Means is provided for effecting the upward and downward movement of the channel members 44 and 46 without tilting from the normally horizontal position shown in FIGURE 3 when the frame 28 is in the "in use" position. Such means includes a guide 48 mounted on a post 50 which rises from the portion of the base member 30 between the legs of the side member 32, as shown most clearly in FIGURE 3. Another post and guide is on the other end of the frame 28 but is not shown in FIGURE 3 but has the same structure as the post 50 and guide 48.

The present invention provides hand actuable means for effecting the upward and downward movement of the rack 40 when in the channel members 44 and 46, such means including a U-shape handle 52 removably carried on the free ends of levers 54 and 56 which are connected by pivot pins to the forward legs of the side members 32 and 34 for rocking movement of such levers about a horizontal axis. The handle 52 is removable from the levers 54 and 56 so that the unit may nest within the well 10 as shown in dotted lines in FIGURE 3.

The inner ends of the levers 54 and 56 are turned to provide lugs 58 and 60, respectively, which ride in channels or recesses provided in the channel members 44 and 46.

Lock means is provided for holding the channel members 44 and 46 in any position of their adjusted upward and downward movement relative to the frame 28, this lock means being a turn button 62 associated with a threaded shaft and a clamping plate 64 which may be tightened into engagement with the adjacent portion of the post 50 so as to prevent upward or downward movement of the associated channel member 44 or 46.

Means is also provided for locking the frame 28 in the vertical position exteriorly or substantially exteriorly of the well 10 and this means consists in a pair of bars 66 and 68 pivotally connected to the base member 30 and swingable from the dotted line position shown in FIGURE 1 to the full line position in which they overlap the edge of the opening in the counter top 22 and support the frame 28 in the vertical position.

The one leg of the side member 32 adjacent the forward end of the frame 28 is provided with a downwardly sloping loop 70 which serves to support the rotisserie spear or spit shown in dotted lines in FIGURE 1 and represented by the numeral 72.

The free end of the spit 72 extends into a motor and timer housing 74' which regulates the interval of time that the current is applied and also drives the spit 72 in rotary movement in order to rotate the food contained thereon under the heating element 38.

Bushings 74 carried on the base member 30 adjacent the rear legs of the side members 32 and 34 receive therein the support rod 76 which has its ends anchored in the side walls 12 and 14 as shown in FIGURE 2. The rod 76 connects a frame 28 to the well 10 for movement from the concealed dotted line position in FIGURE 3 to the vertical full line position in which it may be used substantially above the counter top 22.

A handle 78 on the rear face of the housing 36 provides a hand-hold means by which the frame 28 is moved in and out of the well 10.

A cover 80 extends over the open top of the well 10 when the frame 28 is in the concealed position.

It will be seen therefore that the unit of the present invention provides a means of broiling food or cooking the same on the rotisserie, the heating element 38 lending itself to the charring process by means of which food resting upon the rack 40 is brought into contact momentarily with the surface of the element 38 to char the food and to drive the juices inwardly of the food, at the same time producing the well-known charcoal effect and adding to the enhancement of the food cooked thereon.

The provision of the well makes it possible for the average home owner to have the unit readily available and yet easily turned to its position of concealment within the counter top as desired.

It will be seen that the means for adjusting the rack 40 upwardly and downwardly is with ease and facility locked in any desired position by turning of the turn button 62 at each end of the rack 40 to clamp the channel members 44 and 46 against the respective post to thereby prevent its upward and downward movement.

When the rotisserie element or spit 72 is employed, the rack 40 is pulled forwardly out of the channel members 44 and 46 and the food placed upon the spit 72 is cooked by the direct rays of the heating element 38.

While only a preferred form of the invention has been shown and described, it is contemplated that numerous forms of the invention may be practiced and numerous changes and modifications may be made in the invention without departing from the spirit thereof as set forth in the appended claims.

What is claimed is:

1. A broiler unit comprising a well having a front end and a rear end, spaced side walls, and an open top, means on the upper ends of said walls for supporting said well in the sides of an opening in a table top, a frame having a forward end and a rearward end, said frame in a use position being above and substantially exteriorly of said well and having the portion adjacent the rearward end connected to the sections of said side walls adjacent the rear ends of said side walls for swinging movement from the use position to a nested position within said well, said frame including spaced apart inverted U-shape side members, a housing secured to the bights of said side members, said housing having a recess therein, a source of electrically heated radiant energy seated in said recess, a base member disposed adjacent the free ends of the legs of said side members and secured thereto, a post rising from the portion of said base member between the legs of each of said side members, a horizontally disposed channel member carried by each of said posts for upward and downward movement, said channel members being in face-to-face spaced-apart relation and adapted to slidingly receive edge portions of a broiler rack for support of said rack beneath said heat source, and actuable means connected to said side members and to said channel members for effecting the upward and downward movement of said channel members, and releasable arch means coopeartively engaging the side walls of said well and frame base member for holding said frame in the use position.

2. A broiler unit comprising a well having a front end and a rear end, spaced side walls, and an open top, means on the upper ends of said walls for supporting said well in the sides of an opening in a table top, a frame having a forward end and a rearward end, said frame in a use position being above and substantially exteriorly of said well and having the portion adjacent the rearward end connected to the sections of said side walls adjacent the rear end of said well for swinging movement from the use position to a nested position within said well, said frame including spaced-apart inverted U-shape side members, a housing secured to the bights of said side members, said housing having a recess therein, a source of electrically heated radiant energy seated in said recess, a base member disposed adjacent the free ends of the legs of said side members and secured thereto, a post rising from the portion of said base member between the legs of each of said side members, a horizontally disposed channel member carried by each of said posts for upward and downward movement, said channel members being in face-to-face spaced-apart relation and adapted to slidingly receive edge portions of a broiler rack for support of said rack beneath said heat source, and hand actuable means connected to said side members and to said channel members for effecting the upward and downward movement of said channel members, said hand actuable means consisting of a horizontally disposed U-shaped handle disposed with a bight forwardly of the forward end of said frame and having each leg pivotally connected intermediate the ends thereof to the adjacent leg of the contiguous side member for rocking movement about a horizontal axis, the free end of each handle leg being slidably engaged in recess means provided in each of said channel members and releasable latch means cooperatively engaging the side walls of said well and said frame base member for holding said frame in the use position.

3. A broiler unit comprising a well having a front end and a rear end, spaced-apart side walls, and an open top, means on the upper ends of said walls for supporting said well in the sides of an opening in a table top, a frame having a forward end and a rearward end, said frame in a use position being above and substantially exteriorly of said well and having the portion adjacent the rearward end connected to the sections of said side walls adjacent the rear ends of said well for swinging movement from the use position to a nested position within said well, said frame including spaced-apart inverted U-shaped side members, a source of radiant heat carried by the bights of said side members, a base member disposed adjacent the free ends of the legs of said side members and secured thereto, a post rising from the portion of said base member between the legs of each of said side members, a horizontally disposed channel member carried by each of said posts for upward and downward movement, said channel members being in face-to-face spaced relation and adapted to slidingly receive edge portions of a broiler rack for support of said rack beneath said heat source, and actuable means connected to said side members and to said channel members for effecting the upward and downward movement of said channel members, and releasable latch means cooperatively engaging the side walls of said well and said frame base member for holding said frame in the use position.

4. A broiler unit comprising a well having a front end and a rear end, spaced side walls, and an open top, means on the upper ends of said walls for supporting said well on the sides of an opening in a table top, a frame having a forward end and a rearward end, said frame in a use position being above and substantially exteriorly of said well and having a portion adjacent the rearward end connected to the sections of said side walls adjacent the rear end of said well for swinging movement from the use position to a nested position within said well, said frame including spaced-apart inverted U-shaped side members, a source of heat positioned upon and supported by the bights of said side members, a food supporting rack removably positioned upon said frame, means for adjustably positioning said food supporting rack at various distances from said source of heat, said adjusting means being movable vertically of said frame when said frame is in the use position whereby said rack is movable vertically, releasable lock means operatively connected to said adjusting means and said frame for securing said rack at a desired distance from said heat source, said heat source consisting of an electrically heated quartz crystal slab, said adjusting means consisting of a lever pivotally connected to said frame, and at least one channel means positioned on said frame and operatively connected to said lever, said channel means supporting said food supporting rack.

5. The apparatus according to claim 1 in which the leg of one of said side members contiguous to the forward end of said frame is provided with a U-shaped bend for support therein of an end portion of a rotisserie spit.

6. The apparatus according to claim 4 together with a guide means supporting said channel means for vertical movement only when said frame is in the use position, said guide means consisting of at least one guide rod secured to said frame and a corresponding number of guide plates carried by said guide rod for longitudinal movement therealong.

7. The apparatus according to claim 6 in which said lock means comprises a clamping plate operatively connected to said guide rod, said plate being frictionally engageable with said rod, and cooperating screw threaded hand actuable tightening means on said plate and on said rod for releasably engaging said plate with said rod.

References Cited by the Examiner
UNITED STATES PATENTS

| | | | |
|---|---|---|---|
| 2,294,701 | 9/1942 | Teller et al. | 126—41 |
| 2,708,709 | 5/1955 | Pearce | 126—273 |
| 2,775,237 | 12/1956 | Chadwick | 126—19 |
| 3,027,216 | 3/1962 | Alstyne et al. | 126—19 |
| 3,167,065 | 1/1965 | Del Francia | 126—19 |

WALTER A. SCHEEL, *Primary Examiner.*